US009043955B2

(12) United States Patent
Nafziger et al.

(10) Patent No.: US 9,043,955 B2
(45) Date of Patent: Jun. 2, 2015

(54) HEADER FLOTATION SYSTEM WITH COMPUTER CONTROL FOR A SELF-PROPELLED WINDROWER

(71) Applicant: AGCO Corporation, Duluth, GA (US)

(72) Inventors: Brendon Nafziger, Canton, KS (US); Daniel J. Soldan, Hillsboro, KS (US); Dustin Jost, Newton, KS (US)

(73) Assignee: AGCO Corporation, Duluth, GA (US)

( * ) Notice: Subject to any disclaimer, the term of this patent is extended or adjusted under 35 U.S.C. 154(b) by 256 days.

(21) Appl. No.: 13/834,437

(22) Filed: Mar. 15, 2013

(65) Prior Publication Data

US 2013/0255214 A1    Oct. 3, 2013

Related U.S. Application Data

(60) Provisional application No. 61/618,116, filed on Mar. 30, 2012.

(51) Int. Cl.
*A01D 41/14* (2006.01)
*A01D 47/00* (2006.01)

(52) U.S. Cl.
CPC .............. *A01D 47/00* (2013.01); *A01D 41/141* (2013.01)

(58) Field of Classification Search
CPC . A01B 63/1013; A01D 41/14; A01D 41/141; A01D 41/145; A01D 41/16; A01D 75/20; A01D 75/28; A01D 34/283; A01D 45/021; A01D 67/00; A01D 43/06; A01D 43/04; A01D 43/077; A01D 34/008
USPC ............... 56/208, 228, 15.6–15.8, 12.6, 14.9, 56/10.2 E, 10.2 R; 60/413, 470, 484
See application file for complete search history.

(56) References Cited

U.S. PATENT DOCUMENTS

| | | | | |
|---|---|---|---|---|
| 7,430,846 B2 * | 10/2008 | Bomleny et al. | ........... | 56/10.2 E |
| 7,555,883 B2 * | 7/2009 | Fackler et al. | ............. | 56/10.2 E |
| 7,603,837 B2 * | 10/2009 | Ehrhart et al. | ............. | 56/10.2 E |
| 7,707,811 B1 * | 5/2010 | Strosser | ..................... | 56/10.2 E |
| 7,762,051 B2 * | 7/2010 | Fackler et al. | ................. | 56/15.6 |
| 7,918,076 B2 * | 4/2011 | Talbot | ............................. | 56/208 |
| 8,752,360 B2 * | 6/2014 | Lohrentz | ......................... | 56/208 |
| 8,857,143 B2 * | 10/2014 | Funk et al. | ...................... | 56/208 |
| 8,863,483 B2 | 10/2014 | Patterson et al. | | |

* cited by examiner

Primary Examiner — Robert Pezzuto (57) ABSTRACT

In one embodiment, a header control method for an agricultural machine, the method comprising receiving, through a graphical user interface, operator input corresponding to a first set point and a second set point for flotation pressures corresponding to independently controllable first and second header portions, respectively; and automatically causing first and second sets of hydraulic valves to increase or decrease pressure to the first or second header portions to meet or at least approximate the first and second set points, the first and second sets each comprising opposing-action hydraulic valves, the causing responsive to sensed pressure at respective first and second accumulators associated with respective first and second float cylinders.

19 Claims, 8 Drawing Sheets

HEADER FLOTATION SYSTEM WITH COMPUTER CONTROL FOR A SELF-PROPELLED WINDROWER

CROSS REFERENCE TO RELATED APPLICATION

This application claims the benefit of U.S. Provisional Application No. 61/618,116, filed Mar. 30, 2012, which is hereby incorporated by reference in its entirety.

TECHNICAL FIELD

The present disclosure is generally related to agricultural systems and, more particularly, agricultural machines having harvesting headers.

BACKGROUND

Harvesting machines are commonly used to sever standing crops in the field and deposit the crop back onto the ground in the form of a windrow or swath to sever. A header at the front of a windrower cuts the ripened crop from the field. The crop is transported to the rear of the header and forming shields form a windrow of the crop between the tires or tracks of the machine for natural dry down of the crop. A subsequent field operation picks up the windrows for further processing, such as separating and cleaning in the case of grain crops, or baling or chopping in the case of hay.

Platform headers and draper headers are header types commonly used when harvesting crops such as small grains, peas, lentils, and rice. When operating the header, it is desirable to have the ability to adjust the height at which the crops are cut off and also to sense and change the vertical position of the header to follow changing terrain. To accomplish this, it is known to use a header float system or a terrain following system to enable the header to follow the ground over changing terrain without gouging or digging into the soil.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DESCRIPTION OF EXAMPLE EMBODIMENTS

Overview

In one embodiment, a header control method for an agricultural machine, the method comprising receiving, through a graphical user interface, operator input corresponding to a first set point and a second set point for flotation pressures corresponding to independently controllable first and second header portions, respectively; and automatically causing first and second sets of hydraulic valves to increase or decrease pressure to the first or second header portions to meet or at least approximate the first and second set points, the first and second sets each comprising opposing-action hydraulic valves, the causing responsive to sensed pressure at respective first and second accumulators associated with respective first and second float cylinders.

DETAILED DESCRIPTION

Certain embodiments of a header flotation system and method are disclosed that control a header flotation system of an agricultural machine. In one embodiment, the header flotation system comprises left and right flotation assemblies that receive fluid under pressure from a hydraulic pump, and a controller that serves to adjust the opening and closing of hydraulic, opposing-action pressure adjust valves corresponding to each left and right flotation assembly. The opening and closing, or also referred to herein as on/off adjustment (although in some embodiments, modulating action may be performed), causes the pressure changes that, through respective accumulators and flotation cylinders, enable float operation of the respective left and right header portions. The controller may receive signals corresponding to operator input entered through an operator interface (e.g., display device, such as a plasma screen, liquid crystal diode (LCD) display screen, cathode ray tube (CRT) screen, etc.) and/or sensor signals (e.g., from pressure transducers coupled to the respective accumulators), such operator input establishing a set point or set points at which pressure is to be maintained for header flotation and such sensor input providing feedback of the actual pressure conditions to assist the controller to make the appropriate adjustments to meet or approximate the set point(s).

Conventional flotation systems lack the advanced controls (e.g., GUI, controller) and differ in even the hydraulic arrangement, causing confusion or added complexity to flotation controls and/or operation. In contrast, certain embodiments of a header flotation system as disclosed herein provide advanced features yet enable ease of operator use. That is, the operator is presented with a clear, easy-to-understand operator interface that keeps the technical details of what the system is doing behind the scenes. The controller of certain embodiments of header flotation systems described herein operates in the background to ensure that the desired flotation pressure is maintained regardless of conditions, and in certain implementations, enables operation according to any one of a plurality of different operating modes, one or more of which may enable manipulation of individual flotation pressures to allow for special cutting conditions.

Having summarized certain features of one or more header flotation systems of the present disclosure, reference will now be made in detail to the description of the disclosure as illustrated in the drawings. While the disclosure will be described in connection with these drawings, there is no intent to limit it to the embodiment or embodiments disclosed herein. Further, although the description identifies or describes specifics of one or more embodiments, such specifics are not necessarily part of every embodiment, nor are all of any various stated advantages necessarily associated with a single embodiment. On the contrary, the intent is to cover all alternatives, modifications and equivalents included within the spirit and scope of the disclosure as defined by the appended claims. Further, it should be appreciated in the context of the present disclosure that the claims are not necessarily limited to the particular embodiments set out in the description.

Figure 1:
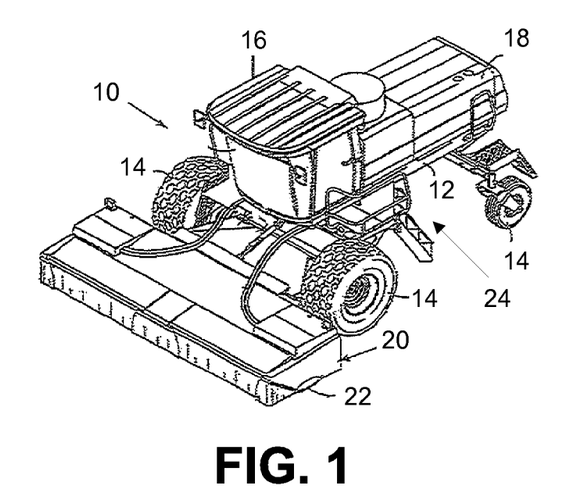
FIG. 1 is a schematic diagram that illustrates an example agricultural machine where an embodiment of a header flotation system may be implemented.

Reference is made to FIG. 1, which illustrates an example agricultural machine where an embodiment of a header flotation system may be implemented. One having ordinary skill in the art should appreciate in the context of the present disclosure that the example agricultural machine, depicted in FIG. 1 as a self-propelled windrower 10, is merely illustrative, and that other machines and/or components (e.g., self-propelled or pull-type rotary mower, combine, etc.) with like functionality may employ certain embodiments of a header flotation system in some embodiments. The self-propelled windrower 10 is operable to mow and collect standing crop in the field, condition the cut material as it moves through the machine to improve its drying characteristics, and then return the conditioned material to the field in a windrow or swath. The windrower 10 may include a chassis or frame 12 supported by wheels 14 (although tracks may be used in some embodiments, or other configurations in the number or arrangement of wheels may be used in some embodiments) for movement across a field to be harvested. The frame 12 carries a cab 16, within which an operator controls operation of the windrower 10 and the header flotation system (e.g., via an operator interface, as discussed below), and a rearwardly spaced compartment 18 housing a power source (not shown) such as an internal combustion engine. A harvesting header 20 is supported on the front of the frame 12 in a manner understood by those skilled in the art.

The header 20 may be configured as a modular unit and consequently may be disconnected for removal from the frame 12. Accordingly, the frame 12 is not dedicated only to those harvesting operations provided by the header 20, but may carry a plurality of different types of modular headers designed to perform different harvesting operations. Similarly, the header 20 may be removed from the frame 12 and installed on other variously constructed mobile frames, such as a pull-type implement. In this respect, it will be appreciated that the principles of the present disclosure are equally applicable to pull-type harvesting machines and machines dedicated only to mowing and conditioning crop. Each side (e.g., left portion, right portion with respect to a centerline of the header) of the header 20 is supported by a respective float cylinder (described below), which are each used to provide a floating function. As is known, the float cylinders apply force to lift arms that hold and carry the header.

As is also known in the art, the header 20 has a laterally extending crop cutting assembly 22 in the form of a low profile, rotary style cutter bed located adjacent the front of the header 20 for severing crop from the ground as the windrower 10 moves across a field. However, one skilled in the art will understand that other types of crop cutting assemblies 22, such as sickle style cutter beds, may also be used in some embodiments.

The windrower 10 also includes a control system 24, which may in one embodiment include left and right flotation assemblies, a controller, and an operator interface as further described below. The control system 24 enables a plurality of different operating modes to be implemented by certain embodiments of a header flotation system through electrical and hydraulic control.

During a harvesting operation, the windrower 10 moves forward through the field with header 20 lowered to a working height. Although emphasis is placed herein on operation of the header as it is running on the ground, it should be appreciated that the windrower 10 includes a conventional lift frame (not shown) which is mounted to the vehicle chassis 12 and detachably interconnects the vehicle chassis 12 with the header 20. The windrower 10 includes a header lift cylinder that actuates a rockshaft, which in turn is coupled to left and right lift linkages and the lift arms, somewhat similar to a tractor 3-point hitch. When operating the header 20, it is well known to have the ability to adjust the height of the header above the surface of the ground to select the height at which the crops are cut.

Figure 2:
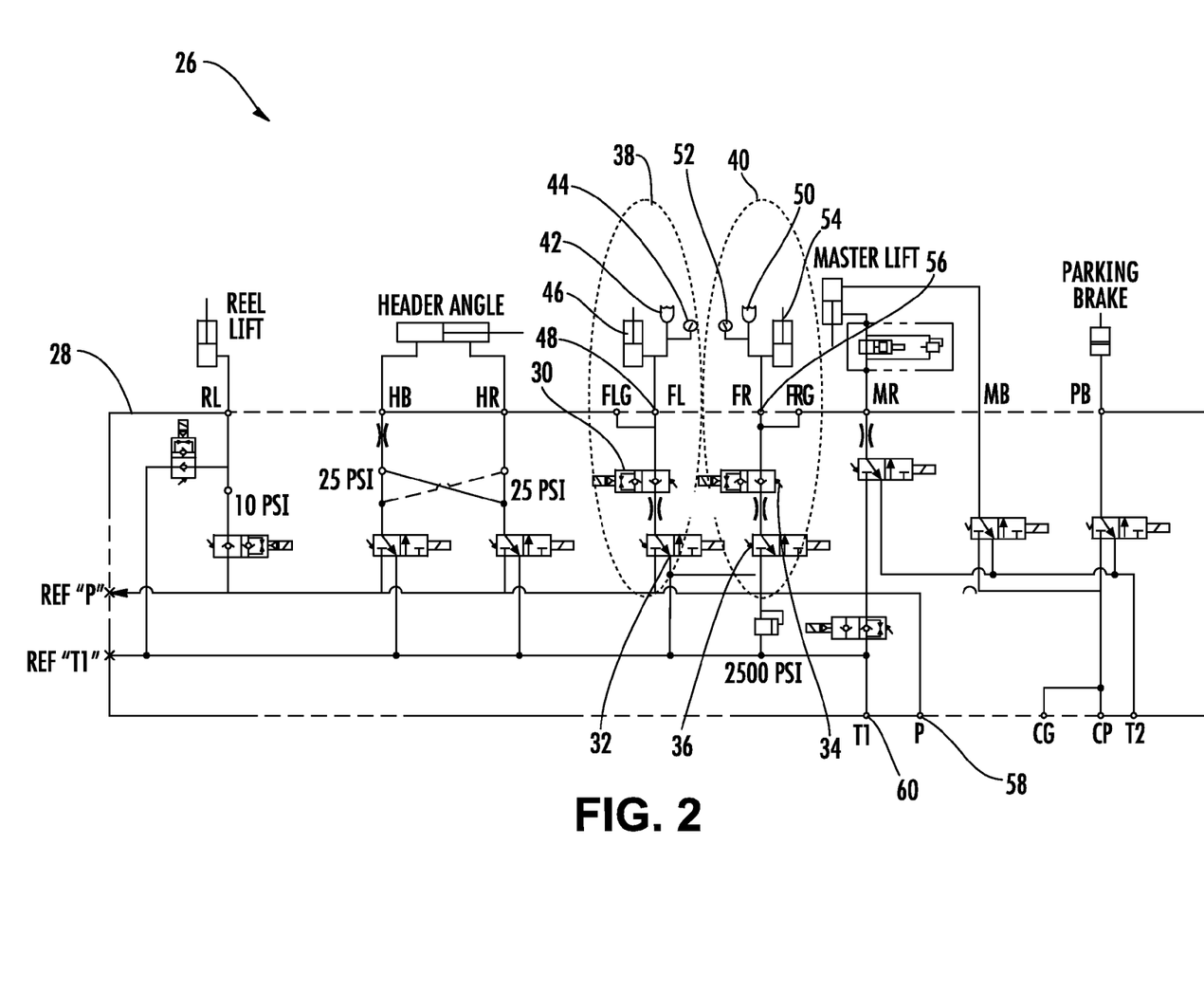
FIG. 2 is a schematic diagram of an embodiment of an example hydraulic control system for an embodiment of a header flotation system.

Having generally described an example agricultural machine 10 embodied as a self-propelled windrower equipped with a header flotation system, attention is directed to FIG. 2, which illustrates an embodiment of the hydraulic portion of the control system 24. Some example values of operation are shown in FIG. 2 for illustration only, with the understanding that other values may be employed depending on the particular implementation. The hydraulic portion, referred to herein also as hydraulic control system 26, comprises a manifold 28 (depicted with dashed lines) with plural ports and plural hydraulic valves equipped for modulating (e.g., proportional) and/or on-off control. Certain components depicted in FIG. 2 are conventional, and hence known, including the mechanisms associated with the reel lift, header angle, master lift, and parking brake. Certain embodiments of the control system 26 may omit one or more of the depicted components, and in some embodiments, may incorporate additional components (e.g., a hydraulic pump). Within the manifold 28 are plural, hydraulic pressure adjust valves 30, 32, 34, and 36, configured in one embodiment as solenoid valves (though other control-type valves energized using electricity or other energy sources may be used in some embodiments). Pressure adjust valve 30 is configured as a pressure decrease valve, and pressure adjust valve 32 is configured as a pressure increase valve. Accordingly, pressure adjust valves 30 and 32 constitute a set or pair of opposing action hydraulic valves that in one embodiment are serially configured. Similarly, pressure adjust valve 34 is configured as a pressure decrease valve, and pressure adjust valve 36 is configured as a pressure increase valve. Accordingly, pressure adjust valves 34 and 36 constitute a set or pair of opposing action hydraulic valves that are serially configured.

Pressure adjust valve pairs 30 and 32 are part of a left flotation assembly 38 (e.g., encircled in FIG. 2 with a dotted ellipse). Pressure adjust valve pairs 34 and 36 are part of a right flotation assembly 40 (e.g., likewise encircled in FIG. 2 with a dotted ellipse). The left flotation assembly 38 further comprises an accumulator 42, a sensor 44 coupled to the accumulator 42, and an associated float cylinder 46. The accumulator 42 and float cylinder 46 are hydraulically coupled to the pressure adjust valves 30 and 32 via port 48 of the manifold 28. The right flotation assembly 40 further comprises an accumulator 50, a sensor 52 coupled to the accumulator 50, and an associated float cylinder 54. The accumulator 50 and float cylinder 54 are hydraulically coupled to the pressure adjust valves 34 and 36 via port 56 of the manifold 28. The sensors 44 and 52 may be configured as pressure transducers, though other types of sensors for sensing these or other types of parameters may be used in some embodiments. Note that the manifold 28 receives pump pressure via port 58 (which couples to a known hydraulic pump or pumps, not shown), and returns fluid from the flow cylinders 46 and 54 to a reservoir (known and not shown) via port 60.

In operation, activation of the pressure adjust valves 30, 32, 34, and 36 causes an increase or decrease in an associated orifice diameter (and hence a change in pressure), resulting in more or less fluid flow to a respective accumulator 42, 50 and flotation cylinder 46, 54 and hence enabling simultaneous or independent header control (e.g., portions of the header 20 are independently controlled) to achieve a set point or as manually controlled (e.g., continual operator interaction or input). Feedback as provided by sensors 44 and 52 and/or operator input provide signals to the pressure adjust valves 30, 32, 34, and 36 to enable the independent (or simultaneous) header portion control.

Figure 3A:
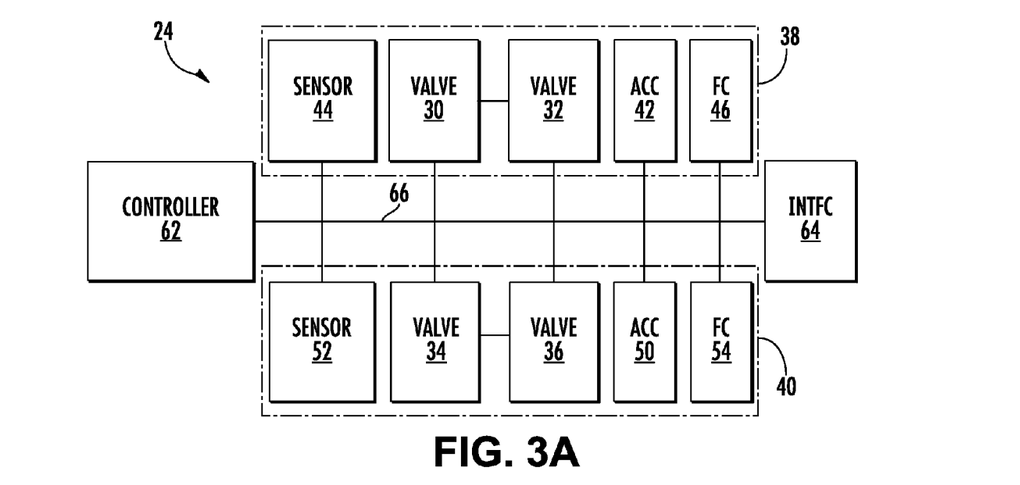
FIG. 3A is a block diagram of an embodiment of an example header control system for an embodiment of a header flotation system.

Reference is now made to FIG. 3A, which illustrates an example embodiment of a header control system (referred to also as simply, control system) 24, which includes components from the hydraulic control system 26 as well as additional control components. One having ordinary skill in the art should appreciate in the context of the present disclosure that the example control system 24 is merely illustrative, and that other control arrangements with fewer, additional, or different components with similar functionality may be employed in some embodiments. The control system 24 comprises a controller 62, an operator interface 64 (abbreviated in FIG. 3A as "intfc"), and the left and right flotation assemblies 38, 40 coupled to each other over a medium 66. The operator interface 64 may be embodied as a display device comprising one of a variety of types of displays, including liquid crystal diode (LCD), cathode ray tube (CRT), plasma, among others, that provide an outputted graphical user interface (GUI) to the operator as described further below. In some embodiments, the operator interface 64 may comprise known touch-screen technology for the entering of inputs by the operator, or immersive technology (e.g., headset in a virtual space). The operator interface 64 further comprises additional controls that may be manipulated by an operator, such as console controls (e.g., electro-mechanical switches, buttons, etc.), which may include controls located on a joystick, steering wheel, panel, etc.

The medium 66 comprises a hydraulic medium, electrical medium (e.g., wired, wireless, or a combination of both), or a combination of both. The electrical portion of the medium 66 may be configured according to a CAN network, among other networks. The hydraulic portion of the medium may be configured with metal (e.g., copper, stainless steel) or non-metal (e.g., plastics, rubber) material (e.g., hoses or tubing), as is known.

In the depicted embodiment, the left flotation assembly 38 comprises the sensor 44, pressure adjust valves 30 and 32, the float cylinder 46 (abbreviated in FIG. 3A as "FC"), and the accumulator 42 (abbreviated in FIG. 3A as "ACC"). The controller 62 is coupled electrically over the medium 66 to the sensor 44 and the solenoids of the pressure adjust valves 30 and 32, as well as to the operator interface 64. The pressure adjust valves 30, 32, float cylinder 46, and the accumulator 42 are coupled to each other hydraulically over the medium 66, as disclosed in association with FIG. 2. Similarly, the right flotation assembly 40 comprises the sensor 52, pressure adjust valves 34 and 36, the float cylinder 54 (abbreviated in FIG. 3A as "FC"), and the accumulator 50 (abbreviated in FIG. 3A as "ACC"). The controller 62 is coupled electrically over the medium 66 to the sensor 52 and the solenoids of the pressure adjust valves 34 and 36, as well as to the operator interface 64. The pressure adjust valves 34, 36, float cylinder 54, and the accumulator 50 are coupled to each other hydraulically over the medium 66, as disclosed in association with FIG. 2.

Figure 3B:
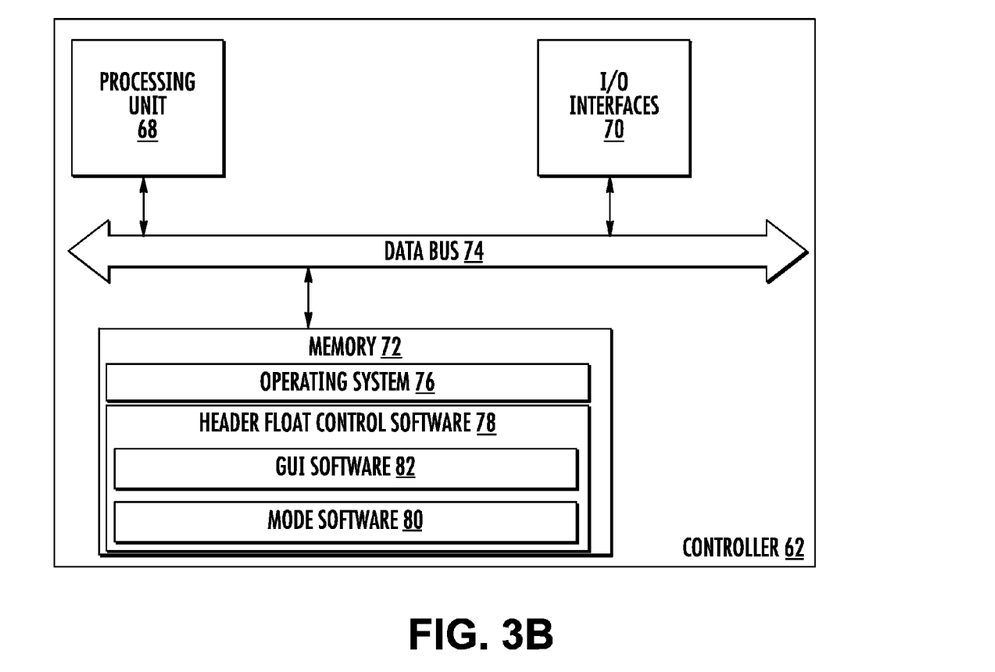
FIG. 3B is a block diagram of an embodiment of an example controller used in an embodiment of an example header control system.

FIG. 3B further illustrates an example embodiment of the controller 62. One having ordinary skill in the art should appreciate in the context of the present disclosure that the example controller 62 is merely illustrative, and that some embodiments may comprise fewer or additional components, and/or some of the functionality associated with the various components depicted in FIG. 3B may be combined, or further distributed distributed among additional modules, in some embodiments. For instance, the controller 62 may be configured as an ASIC, discrete logic components, programmable logic controller (PLC), microcontroller, microprocessor, among other devices enabling control of components over a network. In one embodiment, the controller 62 is embodied as a computing device (e.g., computer), and comprises one or more processing units 68, input/output (I/O) interface(s) 70, and memory 72, all coupled to one or more data busses, such as data bus 74.

The memory 72 may include any one of a combination of volatile memory elements (e.g., random-access memory RAM, such as DRAM, and SRAM, etc.) and nonvolatile memory elements (e.g., ROM, hard drive, tape, CDROM, etc.). The memory 72 may store a native operating system, one or more native applications, emulation systems, or emulated applications for any of a variety of operating systems and/or emulated hardware platforms, emulated operating systems, etc. In the embodiment depicted in FIG. 3B, the memory 72 comprises an operating system 76, and header float control software 78 that in one embodiment comprises mode software 80 and graphical user interface (GUI) software 82.

The mode software 80 enables, through operator selection in a GUI or in response to different events (e.g., sensed or programmed), mode transitions and activation. Within a given activated mode, the mode software 80 enables the activated mode functionality to be achieved based on sensor feedback, operator input (e.g., through operator interface 64), etc.

The GUI software 82 is configured to present, at the operator interface 64, one or more screen presentations that enable user interaction (e.g., via touch screen, mouse, audio input, among other mechanisms for selecting or maneuvering graphic icons in the GUI) and implementing in cooperation with the mode software 80 the underlying functionality of a given mode.

In some embodiments, mode transition and/or mode functionality may be implemented by a state machine. It should be appreciated that in some embodiments, additional or fewer software modules may be employed in the memory 72 or additional memory, the underlying functionality combined, or further distributed, among different devices. In some embodiments, a separate storage device may be coupled to the data bus 74, such as a persistent memory (e.g., optical, magnetic, and/or semiconductor memory and associated drives).

Execution of the software module 78 (e.g., modules 80 and 82, which comprises executable code configured in memory, in the processor, and/or in other non-transitory medium) is implemented by the processing unit 68 under the auspices of the operating system 76. The processing unit 68 may be embodied as a custom-made or commercially available processor, a central processing unit (CPU) or an auxiliary processor among several processors, a semiconductor based microprocessor (in the form of a microchip), a macroprocessor, one or more application specific integrated circuits (ASICs), a plurality of suitably configured digital logic gates, and/or other well-known electrical configurations comprising discrete elements both individually and in various combinations to coordinate the overall operation of the controller 62.

The I/O interfaces 70 provide one or more interfaces to the electrical portion of the medium 66, as well as interfaces for access to computer readable mediums, such as memory drives, which includes optical, magnetic, or semiconductor-based drives. In other words, the I/O interfaces 70 may comprise any number of interfaces for the input and output of signals (e.g., analog or digital data) for conveyance over the medium 66 and other networks. For instance, the output signals may comprise actuation signals for the pressure adjust valve solenoids, and the input signals may correspond to operator input at the operator interface 64 or sensor input, among others. Other devices, such as audible alarms, warning lights, etc. may be controlled through the I/O interfaces 70.

To the extent certain embodiments of the controller 62 (or one or more of its constituent components) are implemented at least in part in logic configured as software/firmware (e.g., executable code), as depicted in FIG. 3B, the logic can be stored on a variety of non-transitory computer-readable medium for use by, or in connection with, a variety of computer-related systems or methods. In the context of this document, a computer-readable medium may comprise an electronic, magnetic, optical, or other physical device or apparatus that may contain or store a computer program for use by or in connection with a computer-related system or method. The logic may be embedded in a variety of computer-readable mediums for use by, or in connection with, an instruction execution system, apparatus, or device, such as a computer-based system, processor-containing system, or other system that can fetch the instructions from the instruction execution system, apparatus, or device and execute the instructions.

To the extent certain embodiment of the controller 62 (or one or more of its constituent components) are implemented at least in part in logic configured as hardware, such functionality may be implemented with any or a combination of the following technologies, which are all well-known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Having described an example header control system 24 of certain embodiments of a header flotation system, a detailed description of operation of the system 24 now follows. When the header control system 24 configures the header flotation system for operation according to an auto float mode, the operation of the header control system 24 is based on a set point for the flotation pressure on each side of the windrower 10. These set points are entered by the operator at the operator interface 64 to provide the desired flotation effect for the header 20 as it rides over the ground. Once these set points are programmed, the controller 62 automatically activates one or more of the hydraulic pressure adjust valves 30-36 to increase or decrease the pressure to keep the actual pressure at, or close to (e.g., approximate), the set point. When the header raise function is activated by the operator (e.g., by adjustment of a physical button or switch in one embodiment), the auto float mode is suspended so that the flotation pressure drops off as the header 20 goes up. Once the operator activates the header down function, the header control system 24 (e.g., as controlled by the controller 62) may wait for several seconds to allow the header 20 to fully lower before re-activating the auto float mode.

The header control system 24 also provides for a manual float mode of operation, in which one or more of the hydraulic pressure adjust valves 30-36 are manipulated directly by operator input (e.g., at the operator interface 64), and no automatic pressure adjustments are performed by the controller 62. The selection of auto or manual float mode is performed by the operator through the selection of a one touch down mode button icon. Note that reference herein to pressing or selecting of a button refers to a touch-screen press of a button icon displayed in a GUI, or selection via an input device (e.g., mouse, keyboard, pointer, verbal command) of a button icon presented on the GUI, or similar functionality (e.g., selection on a keyboard of a alphanumeric button corresponding to the button icon of the same alphanumeric as displayed, selection of an electro-mechanical switch or button, etc.). In some embodiments, physical buttons or switches or levers may be selected as directed by, or in some embodiments without, a displayed GUI. When one touch down is active, the header 20 drops to the ground with a single press of a header down button and the auto float mode is active. The header down button may comprise a physical button located in the operator interface 64, such as on a forward-neutral-reverse lever or other electro-mechanical switch. In one embodiment, the header down button is a given state of a physical switch, such as a three position switch that comprises functionality associated with header raise, lower (down), and off (e.g., hold) functionality. In some embodiments, the header raise, lower, and off functionality may be implemented via on-screen button icons. When one touch down is turned off, the header 20 drops only while the header down button icon is depressed and the manual float mode is active.

In some situations, it may be desirable to lighten one end (e.g., portion) of the header 20 relative to the other end (e.g., portion) such as when cutting on top of a border. Also, if one end of the header 20 is raised completely off the ground the operator has the ability to cut a very narrow strip with the header 20 riding above the previously cut windrows. To allow for these conditions, the auto float mode may be temporarily overridden by what is called the border/strip mode. In this mode, the operator can manually increase or decrease the flotation pressure on either side of the header 20 as required. Two methods may be provided to achieve this functionality.

First, a menu of buttons icons (or physical buttons in some embodiments) in the operator interface 64 may be selected that gives manual control of each of the four pressure adjust valves 30-36 in the header flotation system. The pressure adjust valves 30-36 are energized as long as the corresponding button icons are pressed. When the border/strip mode is activated, the icons below displayed pressure graphs (described below) are altered to alert the operator to the current state of the header flotation system. This override of auto float mode is active until the next time the header down function is activated or until the operator presses a normal button icon presented in the operator interface 64, whichever comes first. Either action returns the header flotation system to auto float mode, the flotation pressures are adjusted to match the set points, and the operator interface button icons revert back to a standard (e.g., home) display.

A second method of activating border/strip mode involves configuring physical buttons on the operator interface 64

(e.g., hydro handle buttons) to provide flotation control. Once configured, depressing a trigger button (e.g., physical switch or button, though in some embodiments, a displayed button icon may be used) in combination with the header raise/lower switch and a header tilt forward/rearward switch (e.g., physical switches, though in some embodiments, button icons may be used) will activate the four valves. A simple double click of the trigger button causes auto float mode to be resumed.

When removing or connecting the header 20 from the windrower 10, one process to implement is to bleed off all the flotation pressure in the float cylinders 46, 54. In one embodiment, this process is accomplished by activating a dump mode through selection of a button icon presented in the operator interface 64. In this mode, both of the flotation decrease valves are held open by the controller 62. At the same time, a valve (e.g., the second valve from the right hand side of FIG. 2, depicted directly beneath "MB") in the manifold 28 connects header lift cylinder (e.g., master lift cylinder in FIG. 2) to charge pressure rather than to a reservoir. This process causes the lift arms to be forced down, which eliminates the need for the operator to force the arms down manually.

Another feature of the system is the ability of the controller 62 to store (e.g., in memory 72) the set points for various headers 20 that may be operated on the same windrower 10. The header control system 24 can identify unique header families such as rotary, auger, draper, and can store parameters for each family. When one header is removed and another installed, the system restores (e.g., automatically upon sensing of the transitioned-to header, or as prompted by the operator in some embodiments) the set points that were last used for the new header.

Figure 4:
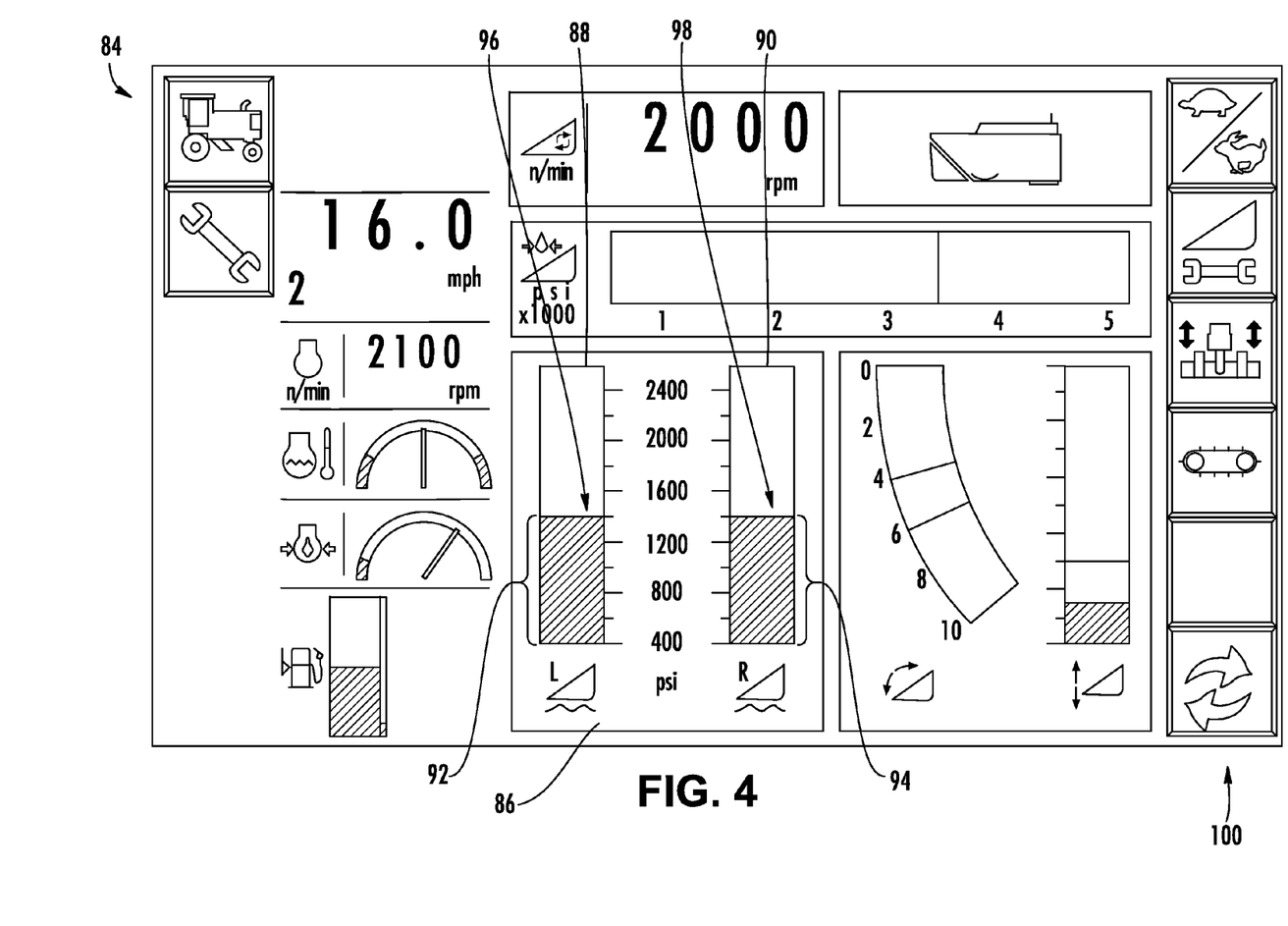
FIG. 4 is an example screen diagram of an embodiment of an example graphical user interface (GUI) that is presented in an operator interface for an embodiment of a header flotation system.

Attention is now directed to some example GUIs presented on an operator interface 64, as depicted in the GUI embodiments illustrated in FIGS. 4-7. One having ordinary skill in the art should appreciate in the context of the present disclosure that the example GUIs are merely illustrative, and that in some embodiments, other formats or visual arrangement may be used to enable mode selection/activation and other mechanisms for enabling header control. Referring to FIG. 4, shown is a home or standard GUI 84 (e.g., home screen), which is normally what an operator may view during operation of the windrower 10. Left and right flotation pressures are depicted in first graph portion 86, and in particular, in left flotation pressure graphic 88 and right flotation pressure graphic 90, respectively. As noted, the left flotation pressure graphic 88 and right flotation pressure graphic 90 are shown in units of PSI, though other units may be used in some embodiments. Graphics 88 and 90 comprises a respective first portion 92 and 94 corresponding to the actual pressure (e.g., as sensed by sensors 44, 52), and a respective second portion 96 and 98 (thin bar running transversely to each graph 88 and 90) corresponding to the respective left and right set points. In this example, the actual pressures match the set points for the left and right portions of the header 20. Additional button icons 100 and other data are presented to inform the operator of various parameters corresponding to operation of the windrower 10.

Figure 5:
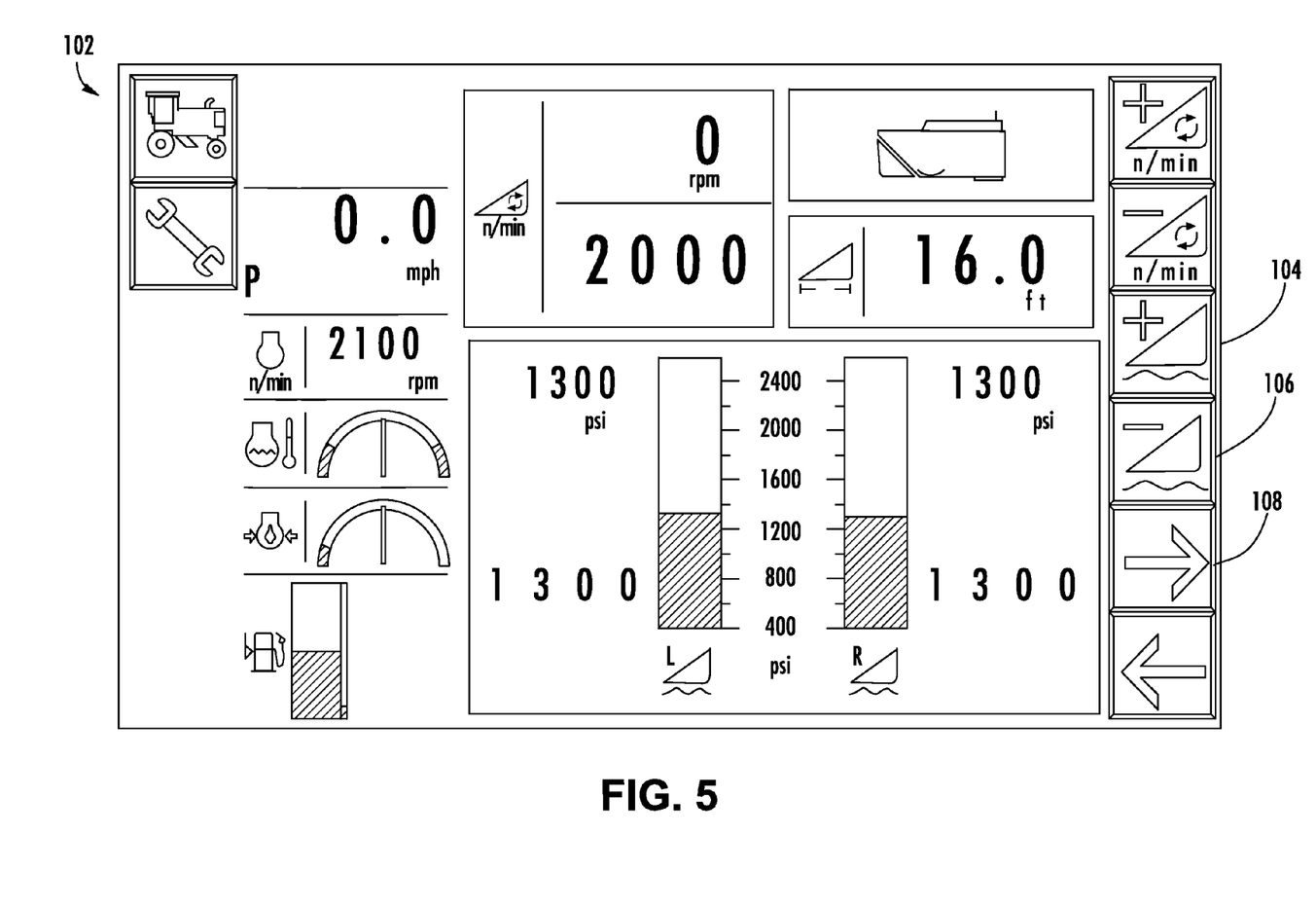
FIG. 5 is an example screen diagram of an embodiment of an example GUI that is presented in an operator interface for an embodiment of a header flotation system.
Figure 6:
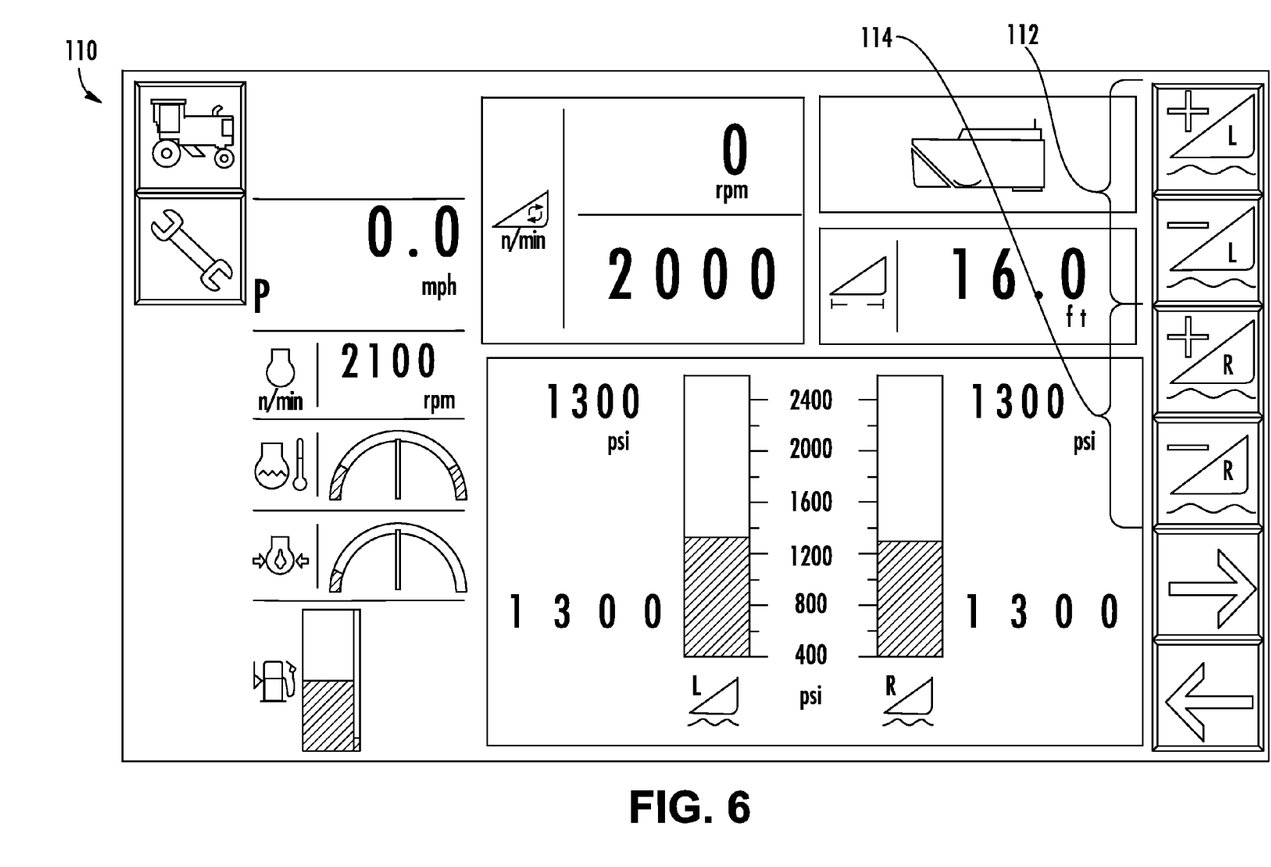
FIG. 6 is an example screen diagram of an embodiment of an example GUI that is presented in an operator interface for an embodiment of a header flotation system.

Referring to FIGS. 5-6, shown are example header adjustment screens 102 and 110, respectively, enabling the operator to program what pressures he or she desires. In the GUI 102, button icons 104 and 106 on the right side of the GUI 500 may be selected to increase or decrease, respectively, the set point on each side or portion of the header 20 together. By selecting the arrow right button icon 108, the GUI 110 is presented, which allows the operator to increase or decrease the pressure on either portion of the header 20 as enabled via button icon sets 112 and 114.

Figure 7:
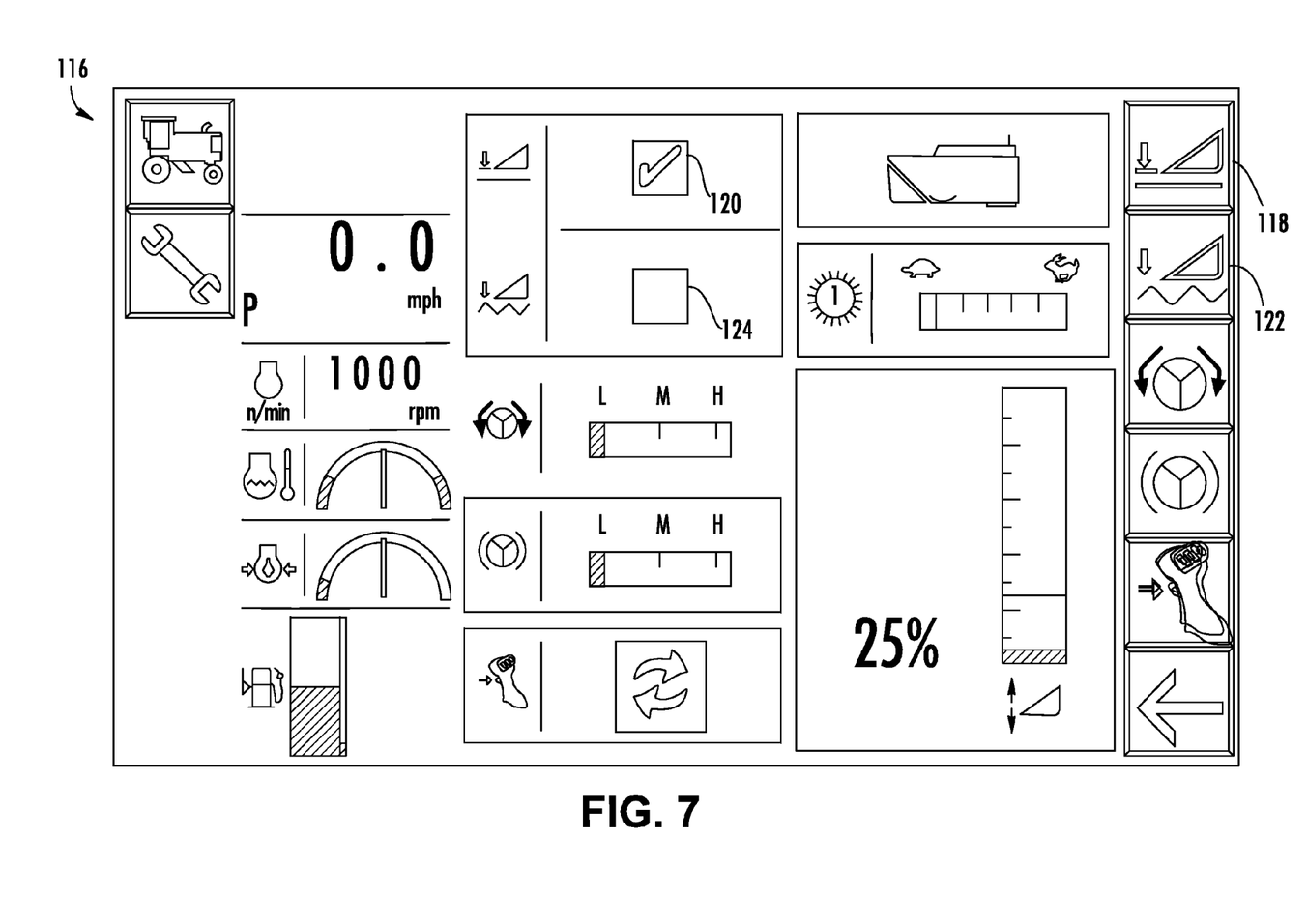
FIG. 7 is an example screen diagram of an embodiment of an example GUI that is presented in an operator interface for an embodiment of a header flotation system.

Referring to FIG. 7, shown is another GUI 116 that illustrates, among other button icons, a one touch down button icon 118, as described above. Toggling this button icon 118 off and on causes the displayed check (or other symbol) in check box 120 to appear or disappear to convey to the operator whether the one touch down mode is active (check appears) or not (no check in the box 120). Also shown in FIG. 7 is a dump mode button icon 122, as described above, with also a corresponding check box 124 for showing a check (or other symbol) or not to convey to the operator whether the dump mode is activated (check shown) or not (no check).

It should be appreciated that, although certain button icons have been selected, other and/or additional mechanisms enabling operator input may be used in some embodiments, such as the use of an encoder wheel adjacent the operator interface 64 to "dial in" a desired setting.

Figure 8:
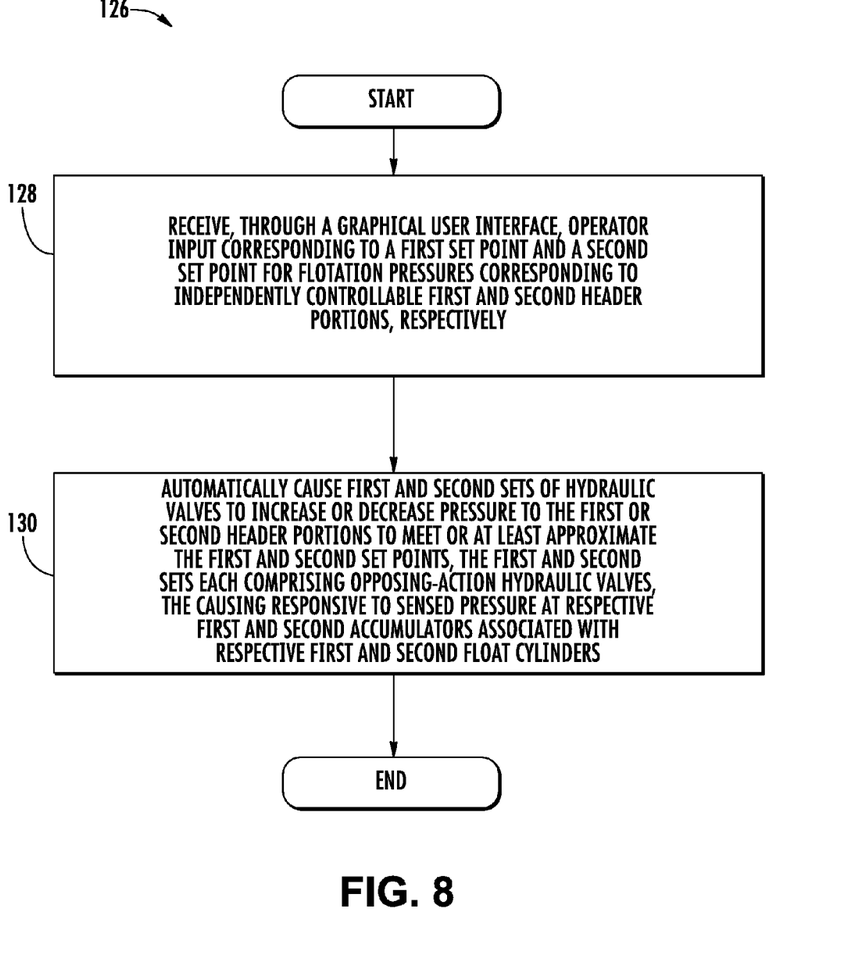
FIG. 8 is a flow diagram that illustrates an example embodiment of a header control method.

In view of the above description, it should be appreciated that one embodiment of a header control method for an agricultural machine, as depicted in FIG. 8 and denoted as method 126, comprises receiving, through a graphical user interface, operator input corresponding to a first set point and a second set point for flotation pressures corresponding to independently controllable first and second header portions, respectively (128); and automatically causing first and second sets of hydraulic valves to increase or decrease pressure to the first or second header portions to meet or at least approximate the first and second set points, the first and second sets each comprising opposing-action hydraulic valves, the causing responsive to sensed pressure at respective first and second accumulators associated with respective first and second float cylinders (130).

Any process descriptions or blocks in flow diagrams should be understood as representing modules, segments, or portions of code which include one or more executable instructions for implementing specific logical functions or steps in the process, and alternate implementations are included within the scope of the embodiments in which functions may be executed out of order from that shown or discussed, including substantially concurrently or in reverse order, depending on the functionality involved, as would be understood by those reasonably skilled in the art of the present disclosure.

It should be emphasized that the above-described embodiments of the present disclosure are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and protected by the following claims.

The invention claimed is:

1. A header control system for an agricultural machine, the system comprising:
   a left flotation assembly corresponding to a first portion of a header, the left flotation assembly comprising:
   a first serial arrangement of first set of pressure adjusting valves;
   a first accumulator; and
   a first float cylinder coupled to the first accumulator, the first set of pressure adjusting valves configured to pass fluid from a pump to the first accumulator and the first float cylinder;

a right flotation assembly corresponding to a second portion of the header, the right flotation assembly comprising:
  a second serial arrangement of a second set of pressure adjusting valves;
  a second accumulator; and
  a second float cylinder coupled to the second accumulator, the second set of pressure adjusting valves configured to pass fluid from the pump to the second accumulator and the second float cylinder;
wherein either the first set or the second set comprises plural opposing action valves; and
a controller coupled to the first and second set of pressure adjusting valves, the controller configured to control the first and second flotation assemblies according to a plurality of different operation modes, wherein the controller is configured to adjust one or more valve openings for the plural opposing valves based on a set point.

2. The system of claim 1, wherein the controller is configured to increase an opening of a first valve of the first set and decrease an opening of a second valve of the first set.

3. The system of claim 1, wherein the controller is configured to increase an opening of a first valve of the second set and decrease an opening of a second valve of the second set.

4. The system of claim 1, wherein the controller is configured to adjust automatically according to a first of the plurality of different operation modes.

5. The system of claim 1, wherein the controller is configured to adjust based on operator input interactively entered during the adjustment, said operator input-based adjustment according to a second of the plurality of different operation modes.

6. The system of claim 1, wherein the controller is configured to store a plurality of set points associated with automatic flotation of a corresponding plurality of different types of headers.

7. The system of claim 6, wherein the controller is configured to apply a first stored set point for adjusting either or both the left flotation assembly or the right flotation assembly responsive to a corresponding first of the plurality of different types of headers being engaged with the agricultural machine.

8. The system of claim 1, wherein the controller is configured to adjust either the left flotation assembly or the right flotation assembly according to a third of the plurality of different operation modes, the third operation mode correspond to enabling exclusive harvesting by the corresponding first or second header portion.

9. The system of claim 8, wherein the controller is configured to operate according to the third operation mode by temporarily suspending a first of the plurality of different operation modes.

10. The system of claim 8, wherein the controller is configured to operate according to the third mode through interactive operator input.

11. The system of claim 8, wherein the controller is configured to operate according to the third mode based on a configuration of a plurality of operator switches.

12. The system of claim 1, wherein the controller is configured to adjust one valve from each of the first and second sets according to a fourth of the plurality of different operation modes, the fourth operation mode corresponding to a dump mode to bleed off flotation pressures.

13. The system of claim 12, further comprising a master lift cylinder and an associated valve to cause a charge pressure to a header lift while the controller adjusts according to the fourth operation mode, wherein operation according to the fourth operation mode causes lift arms corresponding to the first and second header portions to be forced down without continual operator intervention.

14. The system of claim 1, further comprising sensors coupled to the controller and configured to sense pressure at the respective first and second accumulators, the controller configured to independently control the first and second flotation assemblies based on the sensed pressure.

15. The system of claim 1, further comprising an operator interface, the operator interface coupled to the controller, the operator interface comprising a graphical user interface (GUI) that enables the operator to select the plurality of different operation modes.

16. The system of claim 15, wherein the GUI enables the operator to independently select set points for one or more parameters corresponding to operation of each of the left flotation assembly and the right flotation assembly.

17. The system of claim 16, wherein the GUI presents a graph of an actual parameter of the one or more parameters juxtaposed with a set point for the one or more parameters.

18. A header control system for an agricultural machine, the system comprising:
  a left flotation assembly corresponding to a first portion of a header, the left flotation assembly comprising a first pair of opposed-action valves coupled to a first accumulator and a first float cylinder, the left flotation assembly further comprising a first sensor;
  a right flotation assembly corresponding to a second portion of the header, the right flotation assembly comprising a second pair of opposed-action valves coupled to a second accumulator and a second float cylinder, the right flotation assembly further comprising a second sensor;
  an operator interface comprising a graphical user interface (GUI) displayable thereon, the GUI enabling selection of a plurality of different operating modes for the left and right flotation assemblies; and
  a controller configured to independently control the first and second flotation assemblies based on feedback signals from the first and second sensors and based on operator selection of one of the plurality of different operating modes.

19. A header control method for an agricultural machine, the method comprising:
  receiving, through a graphical user interface, operator input corresponding to a first set point and a second set point for flotation pressures corresponding to independently controllable first and second header portions, respectively; and
  automatically causing first and second sets of hydraulic valves to increase or decrease pressure to the first or second header portions to meet or at least approximate the first and second set points, the first and second sets each comprising opposing-action hydraulic valves, the causing responsive to sensed pressure at respective first and second accumulators associated with respective first and second float cylinders.

* * * * *